(12) United States Patent
Alenspach et al.

(10) Patent No.: US 9,073,510 B2
(45) Date of Patent: Jul. 7, 2015

(54) SIDE AIRBAG

(75) Inventors: Guillaume Alenspach, Martainville Epreville (FR); Aimeric D Humieres, Saint Aubin sur Faillon (FR); Sebastien Vanzieleghem, Ry (FR); Nicolas Ganzinotti, Sainte Croix sur Aizier (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/809,307

(22) PCT Filed: Jun. 21, 2011

(86) PCT No.: PCT/SE2011/050815
§ 371 (c)(1),
(2), (4) Date: Mar. 1, 2013

(87) PCT Pub. No.: WO2012/008900
PCT Pub. Date: Jan. 19, 2012

(65) Prior Publication Data
US 2013/0147168 A1 Jun. 13, 2013

(30) Foreign Application Priority Data
Jul. 12, 2010 (DE) .................. 10 2010 026 933

(51) Int. Cl.
B60R 21/231 (2011.01)
B60R 21/2338 (2011.01)
B60R 21/239 (2006.01)

(52) U.S. Cl.
CPC ....... *B60R 21/23138* (2013.01); *B60R 21/2338* (2013.01); *B60R 21/239* (2013.01); *B60R 2021/23382* (2013.01); *B60R 2021/2395* (2013.01)

(58) Field of Classification Search
CPC ............ B60R 21/239; B60R 21/23138; B60R 2021/23146; B60R 2021/23382; B60R 2021/2395
USPC .................................. 280/730.2, 739, 743.2
See application file for complete search history.

(56) References Cited

U.S. PATENT DOCUMENTS 7,810,839 B2 * 10/2010 Denys et al. .................. 280/739
7,891,704 B2 * 2/2011 Taguchi et al. ............... 280/739
7,938,438 B2  5/2011 Denys et al.
(Continued)

FOREIGN PATENT DOCUMENTS

DE  102006051552 A1  5/2008
DE  102006051553 A1  5/2008
(Continued)

OTHER PUBLICATIONS

International Search Report and Written Opinion of the ISA, ISA/SE, Stockholm, mailed Oct. 11, 2011.

*Primary Examiner* — Ruth Ilan
*Assistant Examiner* — Barry Gooden, Jr.
(74) *Attorney, Agent, or Firm* — Harness, Dickey & Pierce, P.L.C.; Stephen T. Olson

(57) ABSTRACT

A side airbag with an outer skin includes a first side wall and a second side wall connected to one another along an edge. An outlet opening is located in the first side wall, and a closing element is located between the two side walls. The closing element has a covering section connected to the outer skin via at least one first connecting area and covering the outlet opening at least partially when the covering section lies against the first side wall.

20 Claims, 4 Drawing Sheets

(56) References Cited

U.S. PATENT DOCUMENTS

| | | | |
|---|---|---|---|
| 8,382,154 B2* | 2/2013 | Suzuki et al. | 280/739 |
| 8,393,638 B2* | 3/2013 | Gottschalk et al. | 280/730.1 |
| 8,573,642 B2* | 11/2013 | Suzuki et al. | 280/739 |
| 2004/0012180 A1* | 1/2004 | Hawthorn et al. | 280/739 |
| 2008/0042416 A1* | 2/2008 | Razazi et al. | 280/743.2 |
| 2009/0001692 A1 | 1/2009 | Denys et al. | |
| 2009/0020991 A1* | 1/2009 | Abe et al. | 280/739 |
| 2009/0039630 A1* | 2/2009 | Schneider et al. | 280/740 |
| 2009/0091106 A1* | 4/2009 | Denys et al. | 280/730.2 |
| 2009/0218798 A1* | 9/2009 | Garner | 280/742 |
| 2012/0068444 A1* | 3/2012 | Suzuki et al. | 280/739 |

FOREIGN PATENT DOCUMENTS

| | | |
|---|---|---|
| EP | 2008879 A1 | 12/2008 |
| WO | 2010076881 A1 | 7/2010 |

\* cited by examiner

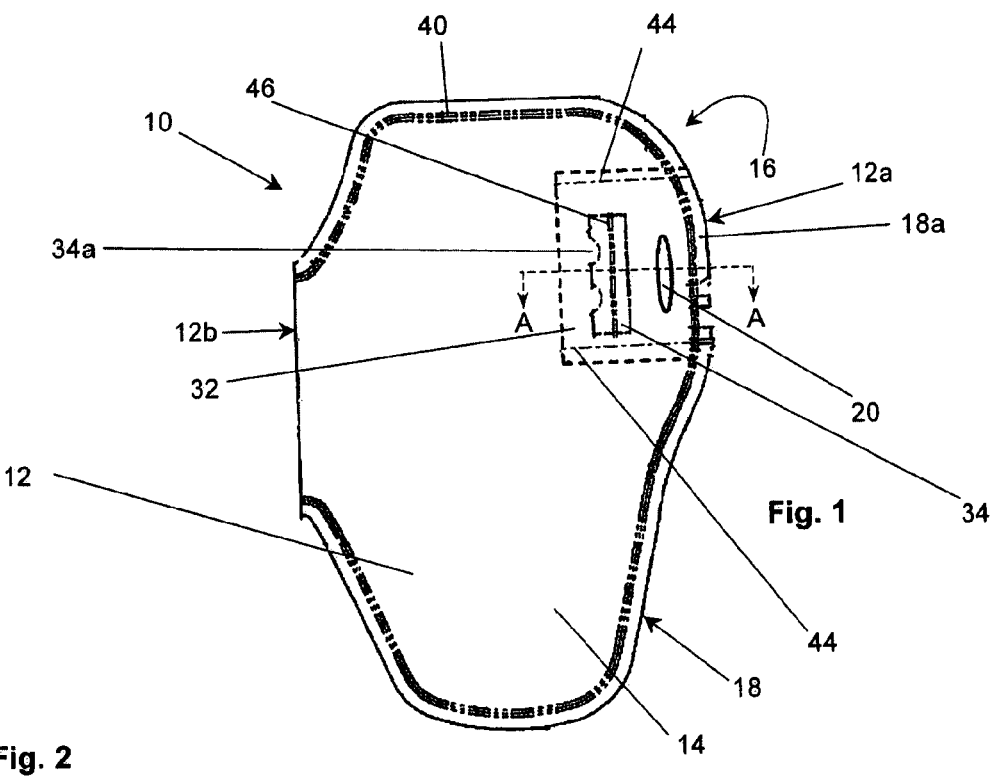
Fig. 1
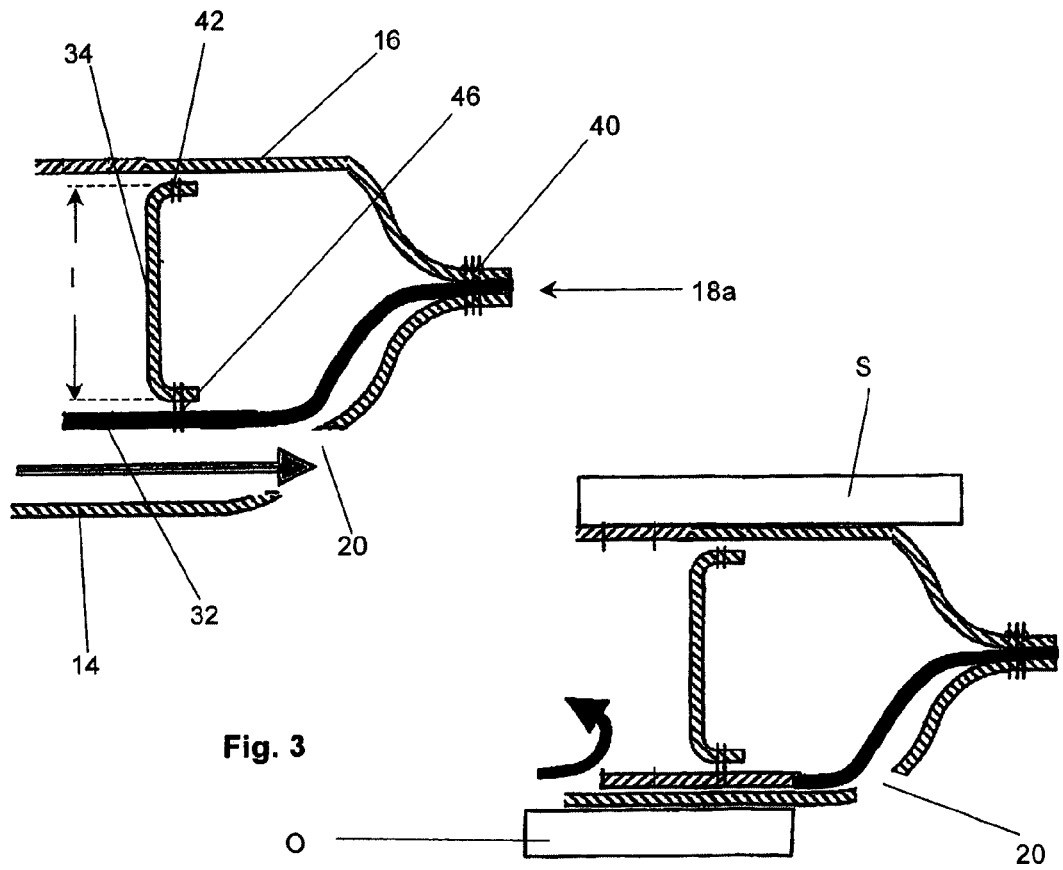
Fig. 2
Fig. 3

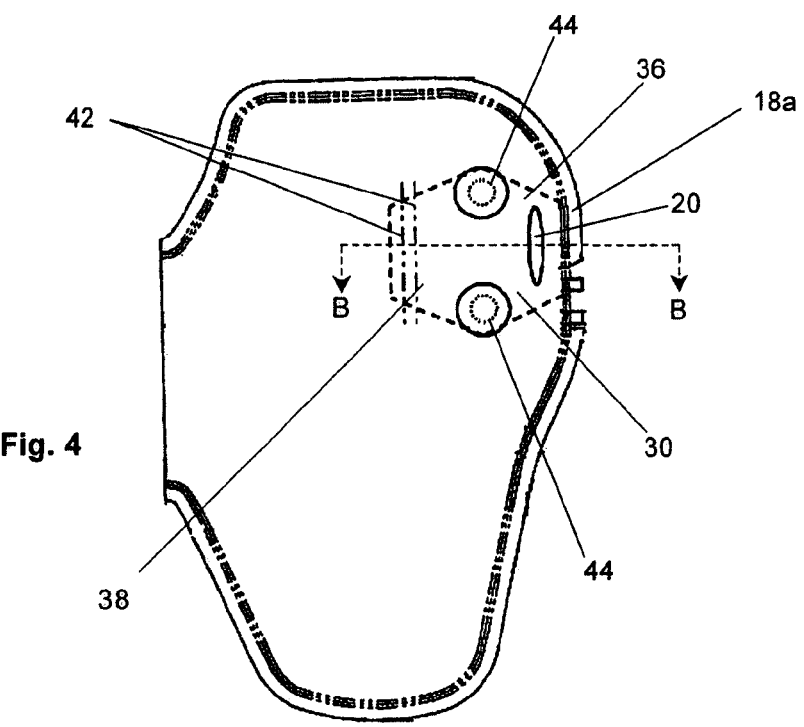
Fig. 4
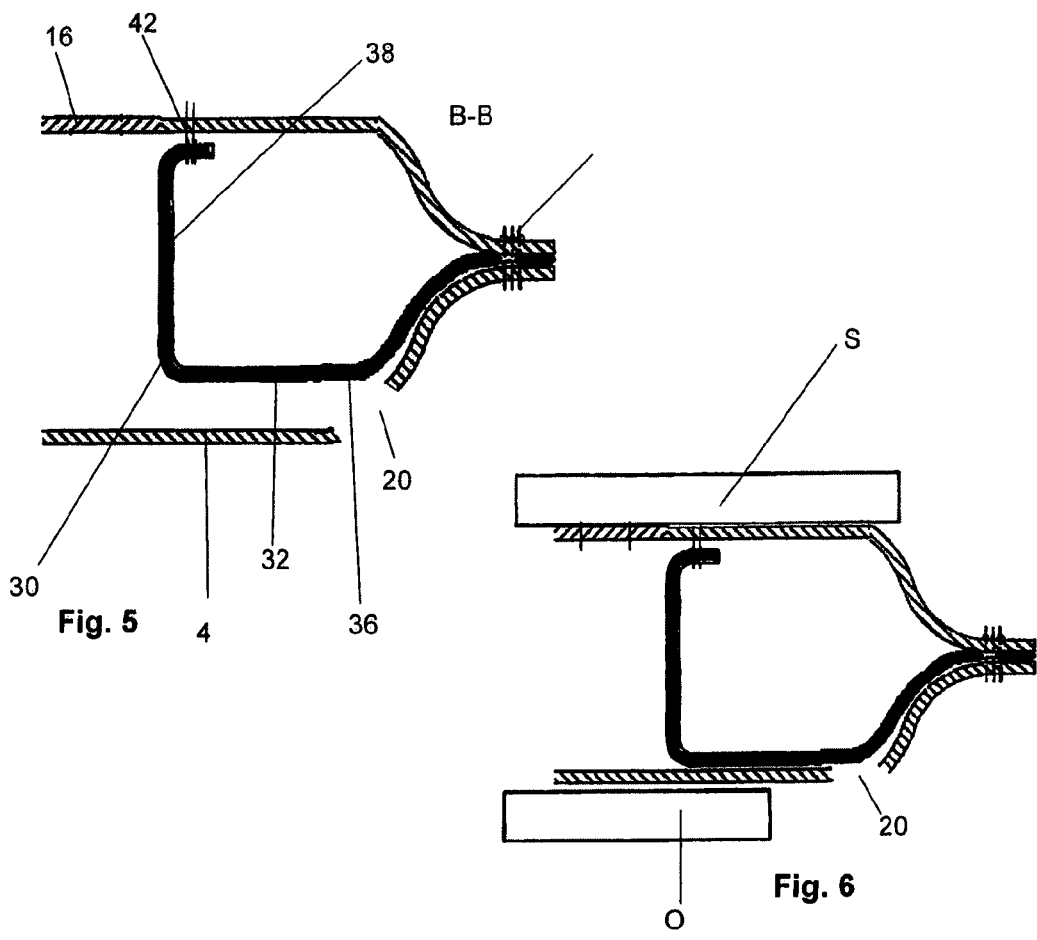
Fig. 5
Fig. 6

SIDE AIRBAG

CROSS-REFERENCE TO RELATED APPLICATIONS

This application is a 371 U.S. National Stage of International Application No. PCT/SE2011/050815, filed Jun. 21, 2011, which claims priority to German Patent Application No. 102010026933.6, filed Jul. 12, 2010. The disclosures of the above applications are entirely incorporated by reference herein.

TECHNICAL FIELD OF THE INVENTION

The invention relates to a side airbag.

The use of side airbags is widespread in the automotive technology of today. A side airbags located in the inner side structure of the vehicle or in the backrest of a seat helps to protect an occupant, especially the thorax of an occupant, during a side collision. As other airbags too, a side airbag needs to be vented in order to properly protect the occupant. Without ventilation, the occupant would simply re-bounce from the side airbag back into the interior of the vehicle. The simplest way to provide the necessary ventilation is to locate a permanently open outlet opening in the outer skin of the airbag, for example in an edge area in which the two side walls of the outer skin are connected to one another. It is clear that if only such a simple ventilation is used, the side airbag has its optimum performance only for an occupant with a given weight and for defined accidents. Many suggestions have been made in order to provide a side airbag which gives a high performance in many different cases (occupants of different seizes/weights, "normal" side crashes or side crashes with an intruding obstacle like a pole or a tree).

PRIOR ART

The generic DE 10 2006 051 552 shows a side airbag with an adaptive internal vent device. With such a side airbag it is possible to get good performance for small and thus light weight occupants as well as for large and thus heavy occupants. The vent device comprises an outlet opening in one side wall—namely the side wall pointing towards the inner structure of the vehicle—of the outer skin and a flap connected to the same side wall basically around this outlet opening and showing through openings. A tether extends from that flap to the other side wall—namely the side wall pointing towards the occupant—in an upper area of the outer skin. The geometry shown is such that the flap closes the outlet opening when a large occupant hits the impact surface of the outer skin but remains open when a small occupant hits the outer skin, since in this case the tether pulls away the flap from the outlet opening. Usually an additional outlet opening is provided so that in any case ventilation takes place.

The EP 2 008 879 A1 shows a 3-chamber adaptive side airbag with a special ventilation arrangement which is made such that an outlet opening is blocked if the two side walls of the outer skin move closer to one another when a predetermined distance. This has the following effect: The side airbag works "normally" in "normal" side impacts. In a high load side impact, especially when an object like a pole or a tree in intrudes into the vehicle, the outlet opening is closed, gas remains in the gas chamber of the side airbag and it is prevented that the occupant strikes through the side airbag onto the hard side structure of the vehicle. A drawback of the described side airbag is its complicated structure that leads to high manufacturing costs.

SUMMARY OF THE INVENTION

Starting from this the invention sets itself the problem to provide a side airbag which gives good protection during a "normal" side crash, prevents the striking through of the occupant in high load cases, especially when an object like a pole or a tree intrudes into the vehicle and which is easy and costs effective to manufacture.

The side airbag has an outer skin comprising a first side wall and a second side wall being connected to one another along an edge. An outlet opening is located in the first side wall, and a closing element is located between the two side walls. Said closing element comprises a covering section being connected to the outer skin via at least one first connecting area and covers said outlet opening at least partially when said covering section lies against the first side wall, and a tether section connecting said covering section with the second side wall via a second connecting area and hindering the covering section from lying against the first side wall when the side airbag is deployed with no obstruction.

According to the invention the closing element is attached to the outer skin via a first connecting area being located between the outlet opening and an edge area or at an edge area and the second connecting area is located on the other side of the outlet opening that the first connecting area, so that the outlet opening lies between these two connecting areas and the gas flow from the interior of the outer skin towards the outlet opening occurs parallel to the first side wall and at least partially in a direction defined by the line second connecting area—outlet opening—first connecting area. By ways of this geometry it achieved that the gas flow through the outlet opening is cut off when the distance between the two side walls falls below a pre-determined value, namely the length of the tether section. This cutting off of the gas stream is to a large extend indifferent to the area of the outer skin on which the occupant impacts.

As one will see later regarding the preferred embodiments of the invention, the side airbag according to the invention has the same effect as side airbag of EP 2008 879 A1 but is much easier to manufacture due to its simple structure.

The invention will now be described in more detail with reference to the figures. The drawings show:

BRIEF DESCRIPTION OF THE DRAWINGS

FIG. 1 is a plan view of a side airbag according to the present teachings;

FIG. 2 is a sectional view along line A-A of FIG. 1, the side airbag illustrated when deployed with no obstruction;

FIG. 3 is another section view taken along the line A-A of FIG. 1, the side airbag illustrated during a high load side impact;

FIG. 4 is a plan view of another side airbag in accordance with the present teachings;

FIG. 5 is a sectional view along line B-B of FIG. 4, the side airbag illustrated when deployed with no obstruction, FIG. 6 is another section view taken along the line B-B of FIG. 4, the side airbag illustrated during a high load side impact.

DETAILED DESCRIPTION OF PREFERRED EMBODIMENTS

Figure 1A:
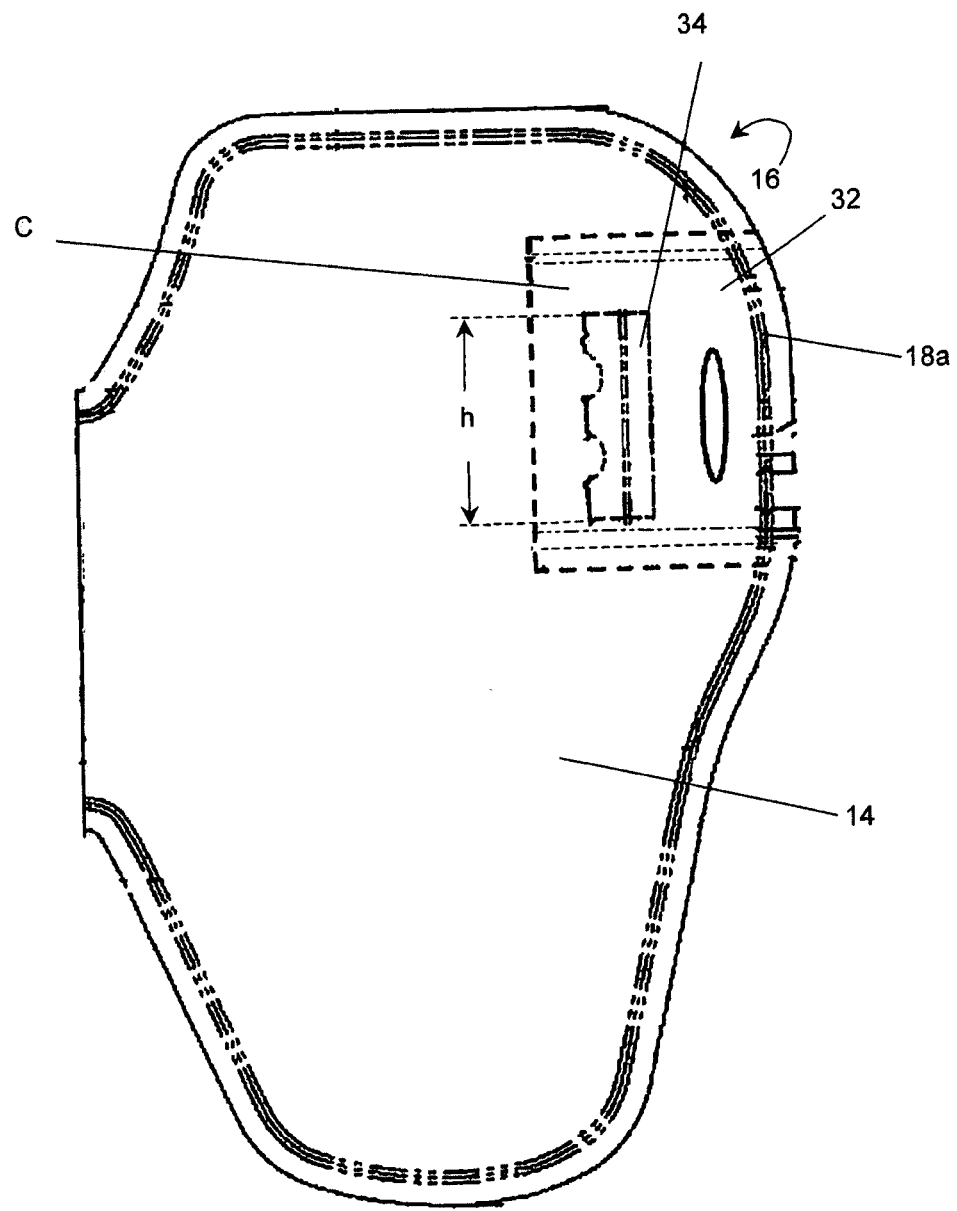
FIG. 1a is an enlarged view of the side airbag of FIG. 1.

FIG. 1 shows a first preferred embodiment of a side airbag 10 according to the invention. This side airbag 10 has an outer skin 12 being comprised of a first side wall 14 and a congruent second side wall 16. The two side walls 14, 16 are connected to one another along an edge 18, for example by means of an edge seam 40. The outer skin 12 of the side airbag 10 extends from a rear end 12b to a front end 12a, so that the edge 18 shows a front edge 18a. In the completely assembled and mounted state, an inflator—in most cases a gas generator (not shown)—is located between the two side walls 14, 16 near the rear end 12b of the outer skin 12.

The outer skin 12 comprises a ventilation arrangement, which is now described in detail: An oblong outlet opening 20 is located in the first side wall 14 near the front edge 18a and extends parallel to a section of the front edge 18a. A closing element is provided between the first side wall 14 and the second side wall 16. This closing element is comprised of a basically rectangular covering element 32 and a tether 34. The covering element 32 and the tether 34 are connected to one another via a connecting seam 46. The tether 34 extends from this connecting seam 46 to the second side wall 16. This tether 34 has a height h and a length l. Holes 34a can be provided in the tether 34 which is usually made of a plastic fabric. The tether 34 is connected to the second side wall 16 via a tether seam 42 (see FIG. 2).

The covering element 32 is held between the first side wall 14 and the second side wall 16 at a section of front edge 18a, so that the covering element 32 is connected to the first side wall and the second side wall by the edge seam 40. So, this section of the edge seam 40 is a first connecting area in which the covering element 32 is attached to the outer skin 12, namely to the first side walls 14 and second side wall 16. Additionally, the covering element 32 is attached to the first side wall 14 via two attachment seams 44 extending along the edges of the covering element 32 from a front edge 18a to the rear end of the covering element 32.

The above defined are the only connections between the closing element 30 and the outer skin 12 of the side airbag 10. Consequently, this side airbag 10 is very easy to manufacture.

The geometry that follows from what was just described is shown in FIG. 1a. From the section of the front edge 18a a connection free area C which has at least the height of the tether (see lines of the pattern dot-double point-dot) of the covering element 32 extends towards the direction of the middle/rear of the outer skin 12. In this connection free area C, the covering element 32 is not attached to the first side wall, but only to the second side wall 16, namely by means of the tether 34. The outlet opening 20 lies in this connection free area C between the front edge 18a and the area where the tether 34 is connected to the second side wall 16, namely by means of the tether seam 42 (see FIGS. 1A and 2). By means of this geometry a kind of channel is created between the covering element 32 and the first side wall 14 connecting the outlet opening 20 with the "regular" chamber which is located between the first and the second side wall. Due to the geometry chosen this channel is open towards the rear of the outer skin. The geometry relates to the case when the airbag is completely unfolded and flat.

Since the length of the tether 34 is less than the maximum thickness of completely deployed side airbag 10, gas streams parallel to the first side wall through this channel and leaves the outer skin 12 through the outlet opening 20. (see FIG. 2). Because of the given geometry, the streaming of the gas occurs basically in a single direction leading to a stack-effect. This effect further leads to the covering element 32 being "sucked" towards the outlet opening 20. Due to the well-known dynamic effects, the total pressure (this is the static pressure plus the dynamic pressure) is in the "channel" section of the covering element larger than on the other side of covering element—this is the area between the covering element and the second side wall 16. So, the covering element 32 builds up an inner wall extending basically parallel to the first side wall.

In case of a high load side impact, especially when an object intrudes into the vehicle, it can happen that the occupant O and thus the first side wall 14 comes closer to the inner structure S of the vehicle and thus second side wall 16 than the lengths of tether 34 (see FIG. 3). In this case the first side wall 14 is pressed against the covering element 32 and the gas flow through the outlet opening 20 is cut off. So no more gas can escape from the interior of the outer skin 12 of the side airbag 10 and a minimum thickness of the side airbag remains, preventing the striking through of the occupant onto the inner structure of the vehicle. Due to the given geometry it is not necessary that the occupant hits a small defined area of the outer skin, for example the area to which the tether is attached. It can be advantageous that no additional outlet opening is present, such that the gas flow is completely cut off if the outlet opening 20 is closed.

Figure 4A:
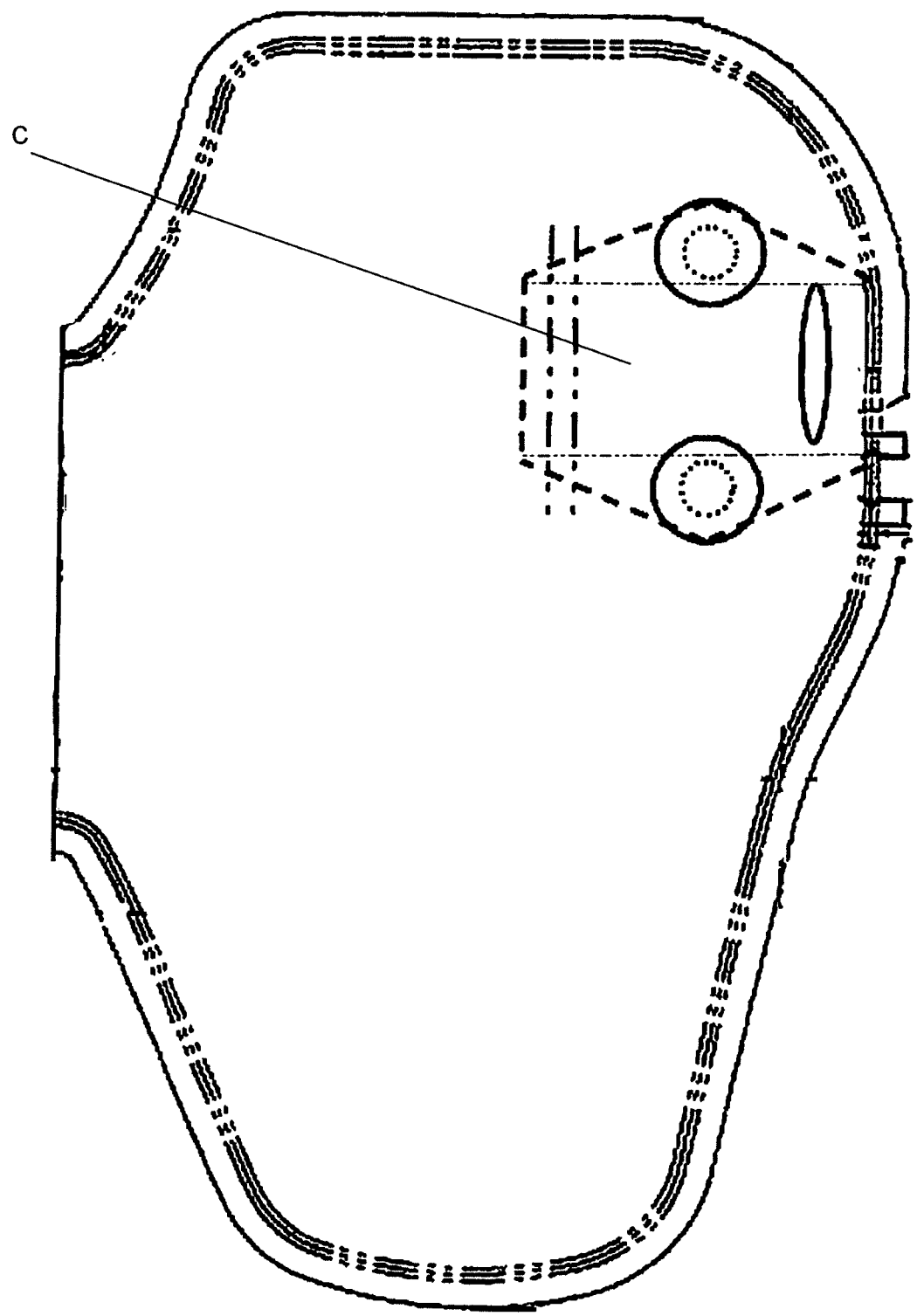
FIG. 4a is an enlarged view of the side airbag of FIG. 4.

The FIGS. 4-6 show a second embodiment. This embodiment is very similar to the first one with the following differences: The closing element 30 is made of a single piece comprising a covering section 36 and a tether section 38. Further, the attachment seams 44 are not linear and running along the edges of the covering section 36 but are of a circular shape and attached on edge areas of the covering section 36. The basic geometry is the same: A connection free area C extends from a section of a front edge 18a in the direction of the rear of the side airbag 10. Except the fact that no "real" channel exists between the tether section and first side wall, this second embodiment works the same way as the first embodiment. Especially an inner side wall running basically parallel to the first side wall is established by the covering section.

In both embodiments, the covering element/covering section does preferably not have through holes since it is desired that the gas flow towards the outlet opening is parallel to the first side wall.

LIST OF REFERENCE NUMBERS

10 Side airbag
11 outer skin
12a front end
12b rear end
14 first side wall
16 second side wall
18 edge
18a front edge
20 outlet opening
30 closing element
32 covering element
34 tether
34a hole
36 covering section
38 tether section
40 edge seam
42 tether seam
44 attachment seam
46 connecting seam
S side structure
O occupant

The invention claimed is:

1. A side airbag comprising:
   an outer skin having a first side wall and a second side wall connected to one another along an edge, an outlet opening located in the first side wall;
   a closing element having a first end and a second end, the first end captured between the first side wall and the second side wall at the edge, the second end spaced from the outer skin, the closing element covering the outlet opening at least partially when the covering section lies against the first side wall; and
   a tether section connecting the covering section with the second side wall via a second connecting area and hindering the covering section from lying against the first side wall when the side airbag is deployed with no obstruction, the covering section attached to the outer skin via a first connecting area located between the outlet opening and an edge area or at the edge area,
   wherein the closing element and the tether section cooperate to maintain a venting channel when the first side wall encounters no obstruction and the side airbag is at full inflation and the closing element abuts the first side wall to close the venting channel when the first side wall encounters an obstruction and inflation of the side airbag is limited.

2. The side airbag according to claim 1, wherein the outlet opening is located near a front edge of the side airbag.

3. The side airbag according to claim 1, wherein the covering section is held between the two side walls at a front edge section of the side airbag.

4. The side airbag according to claim 1, the closing element is a one-pieced element comprising the covering section and the tether section.

5. The side airbag according to claim 1, wherein the closing element is made of a covering element and a separate tether.

6. The side airbag according to claim 1, wherein the covering section is additionally attached to the first side wall via at least one additional connecting area.

7. The side airbag according to claim 1, further comprising at least one hole in the tether section.

8. The side airbag according to claim 1, wherein the closing element extends parallel to the first side wall upon the full inflation of the outer skin.

9. The side airbag according to claim 1, wherein the venting channel passes between the second end of the closing element and the first side wall of the outer skin.

10. The side airbag according to claim 1, wherein the covering section is not attached to the first side wall in an area extending from the second connecting area away from the outlet opening, such that a connection free area in which the covering section is not connected to the first side wall is present.

11. The side airbag according to claim 10, wherein the connection free area extends from a front edge area near the outlet opening to an inside of the side airbag.

12. A side airbag comprising:
   an outer skin having a first side wall, a second side wall and an outlet opening located in the first side wall, the outer skin defining a cavity, the outer skin fully inflatable to a first depth between the first side wall and the second side wall;
   a closing element including a first end and a second end, the closing element located between the two side walls, the closing element including a covering section connected to the outer skin, the closing element further including a tether section extending from the covering section and connected to the second side wall;
   wherein the tether section is operative to maintain a venting channel for venting the airbag through the outlet opening when the outer skin is fully inflated and does not encounter an obstruction and further operative to permit the closing element to close the outlet opening when inflation of the airbag is limited due to encountering the obstruction, the venting channel extending in a direction parallel to an adjacent portion of the closing element and the outer skin and the outlet opening aligned with the direction during venting;
   wherein the first and second ends of the closing element are secured to the outer skin and the closing element is otherwise unrestrained relative to the outer skin; and
   the first and second sidewalls are connected to one another at an edge and the first end is captured between the first sidewall and the second side all at the edge.

13. The side airbag according to claim 12, wherein the tether section is integrally incorporated into the closing element.

14. The side airbag according to claim 12, wherein the closing element extends parallel to the first side wall upon full inflation of the outer skin.

15. The side airbag according to claim 12, wherein the closing element is made of a covering element and a separate tether.

16. The side airbag according to claim 12, wherein the airbag is inflated to a second depth when inflation is limited due to encountering the obstruction.

17. The side airbag according to claim 16, wherein a length of the tether is greater than the second depth.

18. A side airbag comprising:
   an outer skin including a first panel and a second panel connected to one another along an edge, an outlet opening located in the first panel, the outer skin inflatable to an unobstructed depth when no obstruction is encountered and an obstructed depth when an obstruction is encountered; and
   a closing element located between the first and second panels, the closing element having a closing section including a first end secured to at least the first panel on a first side of the outlet opening, the closing section adapted to cover the outlet opening at least partially when the obstructed depth is below a predetermined depth;
   wherein the closing element further includes a tether section extending from the closing section and connecting the closing section to the second panel, the tether section adapted to space a second end of the closing section from the first panel such that a venting channel is defined between the second end and the first panel when the outer skin is inflated to the unobstructed depth, the tether section having a length sufficient for permitting the closing section to close the venting channel when the obstructed depth is below the predetermined depth,
   wherein the venting channel extending in a direction parallel to an adjacent portion of the closing element and the outer skin and the outlet opening aligned with the direction during venting, and
   the first and second sidewalls are connected to one another at an edge and the first end is captured between the first sidewall and the second sidewall at the edge.

19. The side airbag according to claim 18, wherein the closing element is made of a single, continuous piece including the closing section and the tether section.

20. The side airbag according to claim 18,
   wherein the first and second ends of the closing element are secured to the outer skin and the closing element is otherwise unrestrained relative to the outer skin.

* * * * *